US008681838B2

(12) United States Patent
Manku

(10) Patent No.: US 8,681,838 B2
(45) Date of Patent: Mar. 25, 2014

(54) ELECTRONIC DEVICE WITH VCO PULLING COMPENSATION CIRCUIT FOR AN INPUT BASEBAND SIGNAL AND ASSOCIATED METHODS

(75) Inventor: Tajinder Manku, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 407 days.

(21) Appl. No.: 13/052,450

(22) Filed: Mar. 21, 2011

(65) Prior Publication Data
US 2012/0243578 A1 Sep. 27, 2012

(51) Int. Cl.
*H04B 1/38* (2006.01)
*H05K 13/00* (2006.01)

(52) U.S. Cl.
USPC .............................. 375/219; 375/373; 455/76

(58) Field of Classification Search
USPC .................... 375/373, 219, 376; 455/76, 264; 331/23; 327/156; 332/127
See application file for complete search history.

(56) References Cited

U.S. PATENT DOCUMENTS

| 5,794,131 | A  | * | 8/1998  | Cairns ............................. 455/76 |
| 6,321,074 | B1 |   | 11/2001 | Lemay .......................... 455/260 |
| 6,968,020 | B1 | * | 11/2005 | Jayaraman .................... 375/327 |
| 7,372,337 | B2 |   | 5/2008  | Nayler ............................ 331/16 |
| 7,480,343 | B2 |   | 1/2009  | Eikenbroek et al. .......... 375/295 |
| 7,808,325 | B2 |   | 10/2010 | Waheed et al. ............... 331/1 A |
| 2005/0036566 | A1 | * | 2/2005  | Eikenbroek et al. .......... 375/295 |
| 2005/0186918 | A1 |   | 8/2005  | Ramet et al. .................... 455/76 |
| 2006/0009171 | A1 | * | 1/2006  | Xu et al. ..................... 455/114.2 |
| 2006/0202767 | A1 |   | 9/2006  | Nayler ............................ 331/16 |
| 2007/0281651 | A1 | * | 12/2007 | Oosawa et al. ............. 455/245.1 |
| 2008/0139150 | A1 | * | 6/2008  | Li et al. ......................... 455/230 |
| 2008/0311860 | A1 | * | 12/2008 | Tanaka et al. .................. 455/73 |
| 2009/0181626 | A1 | * | 7/2009  | Hallivuori ..................... 455/108 |
| 2009/0268791 | A1 | * | 10/2009 | Waheed et al. ............... 375/219 |
| 2010/0026395 | A1 | * | 2/2010  | Lane ............................... 331/15 |

OTHER PUBLICATIONS

Maxim, Application Note 2019, "Buffer Amplifiers Solve VCO Problems" , May 11, 2003, pp. 1-4.
Terry Yao, ECE1352, "RF Transmitters Architectures for Integration and Multi-Standard Operation", retrieved from internet: http://www.eecg.toronto.edu/~kphang/papers/2003/TYao_RF_TX_circuits.ppt, Dec. 5, 2003, pp. 1-15.

* cited by examiner

*Primary Examiner* — Aristocratis Fotakis
(74) *Attorney, Agent, or Firm* — Allen, Dyer, Doppelt, Milbrath & Gilchrist, P.A.

(57) ABSTRACT

An electronic device includes a transmitter with a baseband input for a baseband signal, a mixer downstream from the baseband input, and a phase-locked loop (PLL) having a voltage controlled oscillator (VCO) and a phase detector coupled thereto, the VCO coupled to the mixer. A power amplifier is downstream from the mixer, and generates at least one aggressing signal that would otherwise generate an output pull of the VCO, causing transmit distortion on a transmit signal. A receiver is coupled to the power amplifier and has a sense input configured to receive the transmit signal. A VCO pulling compensation circuit is coupled to the baseband input and is configured to compensate the at least one baseband signal for the transmit distortion based upon the sensed transmit signal.

17 Claims, 3 Drawing Sheets

ELECTRONIC DEVICE WITH VCO PULLING COMPENSATION CIRCUIT FOR AN INPUT BASEBAND SIGNAL AND ASSOCIATED METHODS

TECHNICAL FIELD

The present disclosure relates to the field of electronic devices, and, more particularly, electronic devices with VCO pulling compensation circuits.

BACKGROUND

Wireless communication technology, which has become a fundamental part of modern communications infrastructures, is evolving at an ever growing pace in order to meet the demanding performance characteristics of new mobile wireless communication devices. It is desired that these new mobile wireless communications devices are able to transmit data with a minimum about of signal distortion.

A typical modulation and power amplification circuit, such as used in the transmitter of known mobile wireless communications devices, includes a mixer coupled between an input signal and a power amplifier. This mixer mixes the input signal with an output signal from a voltage controlled oscillator (VCO), and outputs the combined signal to the power amplifier for wireless transmission.

One cause of transmit signal distortion is known as "pulling," which is undesired coupling between components of the mobile wireless communications device. One particularly undesirable form of pulling is coupling between the transmitter and the VCO. This coupling can cause the frequency of the signal output by the VCO to be "pulled" low, and may also cause distortion in the signal output by the VCO. Since the mixer combines the input signal with the signal output by the VCO, an improper frequency of the signal output by the VCO, or distortion in the signal output by the VCO may result in undesirable distortion of the resulting transmit signal.

One example of coupling between the transmitter and the VCO is where harmonics from additional components of the modulation and power amplification circuit, such as a pre-power amplifier, couple to the VCO at the package or chip level. Another example is that of harmonics present at input/output lines of the power amplifier being coupled to the VCO, also at the package or chip level. In yet another example, coupling between the power amplifier and VCO can occur within a shielding cavity surrounding the transmitter.

Since such coupling or "pulling" results in distortion of the transmitted signal, new transmitter designs that mitigate these effects are desired.

DETAILED DESCRIPTION

Figure 1:
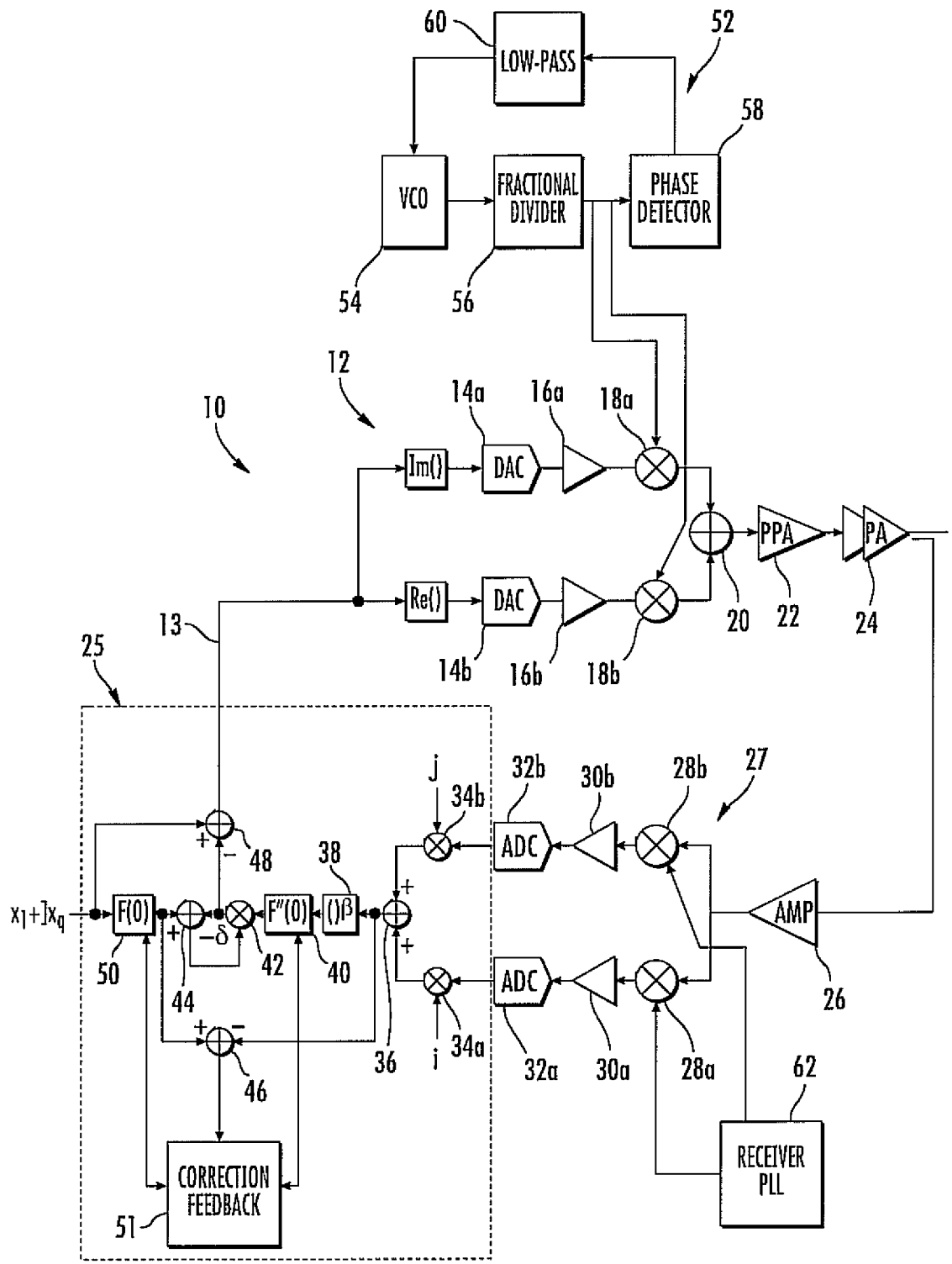
FIG. 1 a schematic block diagram of a mobile wireless communications device in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, an electronic device may include a transmitter comprising a baseband input for at least one baseband signal, at least one mixer downstream from the baseband input, and a phase-locked loop (PLL). The PLL may comprise a voltage controlled oscillator (VCO) and a phase detector coupled thereto, and the VCO may be coupled to the at least one mixer. At least one power amplifier may be downstream from the at least one mixer, and may generate at least one aggressing signal that would otherwise generate an output pull of the VCO, thereby causing transmit distortion on a transmit signal. A receiver may be coupled to the at least one power amplifier and may comprise a sense input configured to receive the transmit signal. A VCO pulling compensation circuit may be coupled to the baseband input and may be configured to compensate the at least one baseband signal for the transmit distortion based upon the sensed transmit signal.

The VCO may operate at a multiple of a desired frequency of the transmit signal. In addition, the VCO pulling compensation circuit may include an exponential block configured to raise the transmit signal to an exponent equal to the multiple of the desired frequency The VCO pulling compensation circuit may further comprises a filter coupled to the exponential block configured to determine the transmit distortion by determining distortion present in the exponential of the received transmit signal. The VCO pulling compensation circuit may further comprise a mixer having a first mixer input coupled to the filter, an adder having an adder output coupled to a second mixer input of the mixer, and a first adder input coupled to a mixer output of the mixer.

The VCO pulling compensation circuit may further comprise an emulated transmitter gain block having an input coupled to the baseband input to receive the baseband signal and an output coupled to a second adder input of the adder. The VCO pulling compensation circuit may also further comprise an additional adder having inputs coupled to the mixer output and the baseband input, and an output coupled to the transmitter.

The electronic device may include an adder having an input coupled to the output of the emulated transmitter gain block, and an output coupled to another input of the emulated transmitter gain block and an input of the filter. The PLL may further comprise a fractional divider coupled between an output of the VCO and the phase detector, and a low-pass filter coupled between the phase detector and the VCO.

A method aspect may be directed to a method of making an electronic device comprising forming a transmitter by coupling at least one mixer downstream from a baseband input for at least one baseband signal, and coupling a voltage controlled oscillator (VCO) to a phase detector, and coupling the VCO to the at least one mixer, to thereby form a phase-locked loop (PLL). At least one power amplifier may be coupled downstream from the at least one mixer, the at least one power amplifier generating at least one aggressing signal that would otherwise generate an output pull of the VCO, thereby causing transmit distortion on a transmit signal.

The method may also include coupling a receiver to the at least one power amplifier, the receiver comprising a sense input configured to receive the transmit signal. The method may further comprise coupling a VCO pulling compensation circuit to the baseband input, and configuring the VCO pulling compensation circuit to compensate the at least one baseband signal for the transmit distortion based upon the sensed transmit signal.

With initial reference to FIG. 1, an electronic device 10 is now described. The electronic device 10 may be a mobile wireless communications device. Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

The electronic device 10 includes a transmitter 12. The transmitter may any suitable digital transmitter, and operate in any suitable frequency band, and should not be construed as being limited to the components shown. The transmitter 12 illustratively includes a baseband input 13 for at least one baseband signal. The at least one baseband signal includes the in-phase (I) and quadrature (Q) transmit signals. The baseband input 13 is coupled to a pair of digital to analog converters (DAC) 14a, 14b. A respective amplifier 16a, 16b is coupled to each DAC 14a, 14b. The electronic device 10 also includes two mixers 18a, 18b respectively coupled to the DACs 18a, 18b. The mixers 14a, 18b may each be an up-converting mixer, for example.

The electronic device 10 also includes a phase-locked loop (PLL) 52 configured to a desired transmit channel. The PLL illustratively includes a voltage controlled oscillator (VCO) 54 coupled to each of the mixers 18a, 18b so that they are driven to a desired transmit channel, for example. The PLL also illustratively includes a fractional divider 56 coupled to an output of the VCO 54, a phase/frequency detector (PFD) 58 coupled to the fractional divider, and a loop filter or low pass filter 60 coupled to an output of the fractional divider. The PFD 56 produces a positive voltage which may increase the output frequency when the VCO output is lower than the desired output frequency and vice versa. This may be done by comparing the VCO divided output from the fractional divider 56 to a frequency reference signal $F_{ref}$ and producing a control voltage (error signal) that is filtered by the low pass filter 60 to remove noise. The PFD 56 generates a voltage signal that is generally proportional to the difference between the reference frequency and the frequency at the output of the fractional divider 56. The control voltage may regulate the voltage control of the VCO 54 to drive the error signal to zero, for example.

The characteristics of the VCO 54 are such that both the input and the power supply of the VCO changes the output frequency. A typical cross coupled LC tank based low phase noise VCO provides input control that selects the center frequency and bias control that selects the tail current. The transfer function from the voltage input of the VCO 54 to the output frequency is governed by $K_{VCO}/S$ where $K_{VCO}$ determines the change in output frequency per Volt of change in the input signal. The transfer function from the power supply (not shown) is similar and managed by a different value $K_{push}$, which generally determines the change in the output frequency with the change in the supply voltage $V_{DD}$. This concept is widely known as supply pushing.

The electronic device 20 also includes a power pre-amplifier (PPA) 22 and a power amplifier (PA) 24 downstream from the two mixers 18a, 18b. The outputs from the two mixers 18a, 18b is summed at the summer 20 before being input to the power pre-amplifier 22. The output from the power pre-amplifier 22 is input to the power amplifier 24. The power amplifier 24 may typically provide 2 Watts of output power to a radiating antenna (not shown). As will be appreciated by those skilled in the art, the output of the power amplifier 24 may include modulation data around a carrier frequency, whereas an oscillator driving the mixer(s) may be a continuous wave (CW) signal at the carrier frequency in a direct conversion transmitter. In some embodiments, the power pre-amplifier 22 may not be included or additional pre and/or power amplifiers and/or power amplifier drivers may be used.

The power amplifier 24 generates an aggressing signal that would otherwise generate an output pull of the VCO 54. The aggressing signal can be interpreted in several ways. One way is to recognize that the amplitude modulation of the signal at the output of the power amplifier 24 bounces the ground that is shared by the VCO 34.

As will be appreciated by those skilled in the art, VCO pulling increasingly affects operation of components within the electronic device 10, and thus may negatively affect communications performance. This is generally due to the VCO frequency output feeding into the up-conversion mixers 18a, 18b that, in turn, feed the input of the power pre-amplifier 22, and, thus, creates a closed loop. Particular attention to power supply design and isolation of the power amplifier from other circuitry, for example, may reduce the effect on the communications performance.

When an aggressing signal is brought closer to the VCO 54, it pulls the VCO output frequency to follow the aggressing signal. There are several mechanisms described in literature that create the pulling of the VCO 54. The VCO 54 is generally a nonlinear circuit, and thus, it may down convert the aggressing signal and produce a down converted aggressing signal that modulates the input of the VCO over and beyond the control voltage forced by the PLL. This may cause an undesired disturbance for the PLL that it tries to counteract. However, while the PLL reacts, the output of the VCO 54 follows the aggressing signal and may cause exceeding of an emission spectrum at the output of the power amplifier 24, for example.

The aggressing signal moves the power and ground. On the supply side ($V_{DD}$), a decoupling capacitor (not shown) placed directly on the supply of the VCO 54 may be used to help protect against the aggressing signal. A capacitor may not provide adequate protection due to the inductance of the wires that connect the supply of the VCO 54 to the power, however.

Moreover, there may be a physical size limitation to the amount of decoupling capacitors that may be placed within a limited space on an integrated circuit, for example, that includes the VCO 54 and power pre-amplifier 22. Coupling capacitors external to the integrated circuit (IC) including the components of the electronic device 10 typically do not help address this problem because bond wires are inductive and provide significant impedance at the RF carrier frequencies. Hence, the VCO 54 may have limited protection by the decoupling capacitor and by the PLL itself. As will be appreciated by those skilled in the art, typically, the board layout should be such as to reduce the inductance and resistance from the supply of the VCO 54 to external power. It is highly desirable that the ground seen by the VCO 54 is as close to a ground seen by the power amplifier 24 as possible. To address this, grounding layers on the IC level, package substrate level, and PCB level are increased, while very short traces are used to extend from the IC, for example, to the power amplifier 24. This becomes increasingly difficult when considering multi-mode, multi-band radios that use several power amplifiers and external components. The power amplifiers may also have to be electromagnetically shielded by placing them in individual metal enclosures or cans that occupy limited board space on small form-factor phones, for example.

To avoid the time consuming approach of multiple board revisions of an electronic device and the chip substrate improving isolation step by step, the current disclosure includes an approaches to address this problem by predistorting the baseband signal so as to cancel out the distortion to the transmit signal resulting from the VCO pulling.

To address the VCO pulling caused by the aggressing signal, the electronic device 10 includes a VCO pulling compensation circuit 25 coupled to the input and a receiver 27. The receiver includes an amplifier 26 coupled to the power amplifier 24 which receives the signal transmitted thereby. A pair of mixers 28a, 28b are coupled to the amplifier 26. A receiver PLL 62 is coupled to the mixers 28a, 28b. The mixers 28a, 28b are in turn coupled to amplifiers 30a, 30b, which are in turn coupled to analog to digital converters (ADCs) 32a, 32b. The ADCs 32a, 32b are coupled to mixers 34a, 34b, the outputs of which are summed by the summer 36.

The VCO pulling compensation circuit 25 is configured to compensate the at least one baseband signal for the transmit distortion caused by aggressing signal and the resulting VCO pulling, based upon a sensed transmit signal.

It should be appreciated that the VCO 54 operated at a multiple of a desired frequency of the transmit signal. For example, if the desired transmit frequency is X, the VCO may be operated at 2X, 4X, 8X, etc. The summer 36 is coupled to an exponential block 38, which is configured to raise the transmit signal to an exponent equal to the multiple of the desired frequency. This is performed so as to allow inspection of the harmonics of the transmit signal, which are where particularly troublesome distortion often occurs. For example, if the VCO 54 is operating at 2X, the VCO pulling results from the aggressing signal is at 3BB assuming the transmit signal xi and xj were signal tones inputted at a frequency of BB. Similarly, if the VCO 54 is operating at 4X, the pulling tone is at −5BB, and the corresponding distortion tone is at 5BB. Further, if the VCO 54 is operating at 8X, the pulling tone is at 9BB, and the corresponding distortion tone is at −9BB.

The exponential block 38 is coupled to a filter 40. The filter 40 is configured to determine the transmit distortion by determining distortion present in the harmonics of the received transmit signal, and is made to emulate the response of the TX PLL from the input of the VCO to it's output, for example.

The filter 40 is coupled to a first input of a mixer 42. An output of a summer 44 is coupled to the second input of the mixer 42, and the output of the mixer is in turn coupled to a first input of the summer 44. An output of an emulated transmitter gain block 50 is coupled to the second input of the summer 44. The emulated transmitter gain block 50 accepts the at least the baseband signal and amplifies it by a gain and a phase rotation. The second input of the summer 44 and the output of the summer 36 are coupled to the inputs of a summer 46, the output of which is coupled to a correction feedback block 51. The correction feedback block 51 determines the difference between the received transmit signal and the at least one baseband signal, and outputs correction values to the emulated transmitter gain block 50 and filter 40. For example, it sends corrected gain and phase rotation values to the emulated transmitter gain block 50, and filter tap values to the filter 40.

The output of the mixer 42, as well as the at least one baseband signal, are coupled to an adder 48. The output of the adder 48 represents the input 13 to the transmitter 12.

Through the mixer 42, and summers 44, 48 the inverse of the distortion as determined by the filter 40 and the exponential block 38 is added to the at least one baseband signal on the input 13. This pre-distortion is then canceled out by the distortion caused by the VCO pulling, and the resulting transmit signal is clean.

Figure 2:
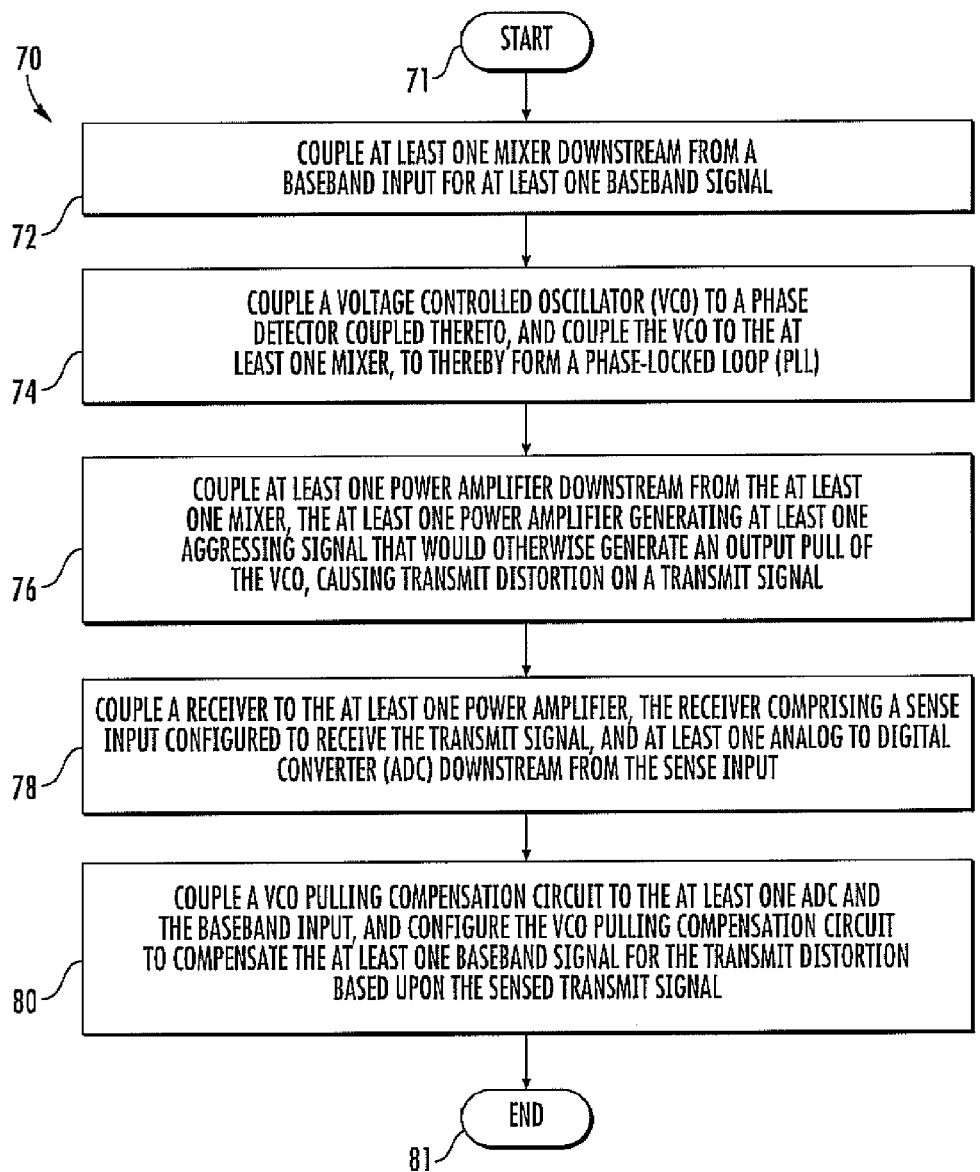
FIG. 2 is a flowchart of a method of making the mobile wireless communications device of FIG. 1.

With reference to the flowchart 70 of FIG. 2, a method of making a mobile wireless communications device is now described. After the start (Block 71), at least one mixer is coupled downstream from a baseband input for at least one baseband signal (Block 72).

Then a voltage controlled oscillator (VCO) is coupled to a phase detector, and the VCO is coupled to the at least one mixer, to thereby form a phase-locked loop (PLL) (Block 74). Thereafter, at least one power amplifier is coupled downstream from the at least one mixer, the at least one power amplifier generating at least one aggressing signal that would otherwise generate an output pull of the VCO, causing transmit distortion on a transmit signal (Block 76).

Next, a receiver is coupled to the at least one power amplifier, the receiver comprising a sense input configured to receive the transmit signal, and at least one analog to digital converter (ADC) downstream from the sense input (Block 78). Furthermore, a VCO pulling compensation circuit is coupled to the at least one ADC and the baseband input, and the VCO pulling compensation circuit is configured to compensate the at least one baseband signal for the transmit distortion based upon the sensed transmit signal (Block 80). Block 81 indicates the end of the method.

Example components of a mobile wireless communications device 1000 that may be used in accordance with the above-described embodiments are further described below with reference to FIG. 3. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 3:
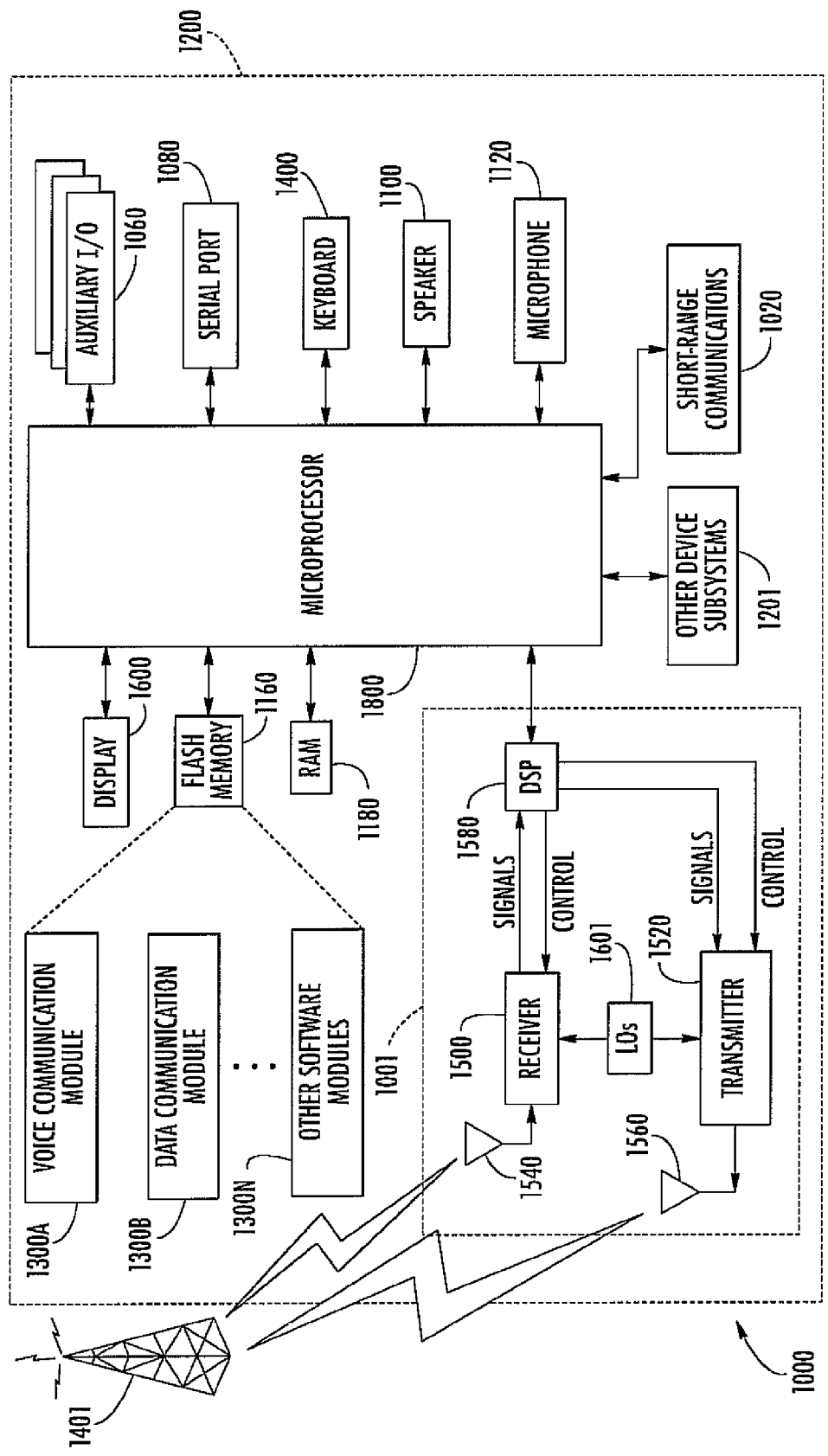
FIG. 3 is a schematic block diagram illustrating example components of a mobile wireless communications device that may include the components shown in FIG. 1.

In addition to the processing device 1800, other parts of the mobile device 1000 are shown schematically in FIG. 3. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (CPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An electronic device comprising:
  a transmitter comprising
    a baseband input for at least one baseband signal,
    at least one mixer downstream from said baseband input,
    a phase-locked loop (PLL) comprising a voltage controlled oscillator (VCO) and a phase detector coupled thereto, said VCO coupled to said at least one mixer and operating at a multiple of a desired frequency of a transmit signal,
    at least one power amplifier downstream from said at least one mixer, generating at least one aggressing signal that would otherwise generate an output pull of said VCO, causing transmit distortion on the transmit signal;
  a receiver coupled to said at least one power amplifier and comprising a sense input configured to receive the transmit signal; and
  a VCO pulling compensation circuit coupled to said baseband input and configured to compensate the at least one baseband signal for the transmit distortion based upon the sensed transmit signal, said VCO pulling compensation circuit comprising an exponential block configured to raise the transmit signal to an exponent equal to the multiple of the desired frequency.

2. The electronic device of claim 1, wherein said VCO pulling compensation circuit further comprises a filter coupled to said exponential block configured to determine the transmit distortion by determining distortion present in the exponential of the received transmit signal.

3. The electronic device of claim 2, wherein said VCO pulling compensation circuit further comprises:
  a mixer having a first mixer input coupled to said filter; and
  an adder having an adder output coupled to a second mixer input of said mixer, and a first adder input coupled to a mixer output of said mixer.

4. The electronic device of claim 3, wherein said VCO pulling compensation circuit further comprises an emulated transmitter gain block having an input coupled to the baseband input to receive the baseband signal and an output coupled to a second adder input of said adder.

5. The electronic device of claim 4, wherein said VCO pulling compensation circuit further comprises an additional adder having inputs coupled to the mixer output and the baseband input, and an output coupled to said transmitter.

6. The electronic device of claim 5, further comprising an adder having an input coupled to the output of the emulated transmitter gain block, and an output coupled to another input of the emulated transmitter gain block and an input of the filter.

7. The electronic device of claim 1, wherein said PLL further comprises a fractional divider coupled between an output of said VCO and said phase detector, and a low-pass filter coupled between said phase detector and said VCO.

8. An electronic device comprising:
a transmitter comprising
a baseband input for at least one baseband signal,
at least one mixer downstream from said baseband input,
a phase-locked loop (PLL) comprising a voltage controlled oscillator (VCO) operating at a multiple of a desired frequency of a transmit signal, a phase detector coupled to said VCO, a fractional divider coupled between an output of said VCO and said phase detector, and a low-pass filter coupled between said phase detector and said VCO, said VCO coupled to said at least one mixer,
at least one power amplifier downstream from said at least one mixer, generating at least one aggressing signal that would otherwise generate an output pull of said VCO, causing transmit distortion on the transmit signal;
a receiver coupled to said at least one power amplifier and comprising a sense input configured to receive the transmit signal; and
a VCO pulling compensation circuit coupled to said baseband input and configured to compensate the at least one baseband signal for the transmit distortion based upon the sensed transmit signal, said VCO pulling compensation circuit comprising an exponential block configured to raise the transmit signal to an exponent equal to the multiple of the desired frequency.

9. The electronic device of claim 8, wherein said VCO pulling compensation circuit further comprises a filter coupled to said exponential block configured to determine the transmit distortion by determining distortion present in the exponential of the received transmit signal.

10. The electronic device of claim 9, wherein said VCO pulling compensation circuit further comprises:
a mixer having a first mixer input coupled to said filter; and
an adder having an adder output coupled to a second mixer input of said mixer, and a first adder input coupled to a mixer output of said mixer.

11. A method of making an electronic device comprising:
forming a transmitter by
coupling at least one mixer downstream from a baseband input for at least one baseband signal,
coupling a voltage controlled oscillator (VCO) operating at a multiple of a desired frequency of a transmit signal to a phase detector, and coupling the VCO to the at least one mixer, to thereby form a phase-locked loop (PLL), and
coupling at least one power amplifier downstream from the at least one mixer, the at least one power amplifier generating at least one aggressing signal that would otherwise generate an output pull of the VCO, causing transmit distortion on the transmit signal;
coupling a receiver to the at least one power amplifier, the receiver comprising a sense input configured to receive the transmit signal; and
coupling a VCO pulling compensation circuit to the baseband input, and configuring the VCO pulling compensation circuit to compensate the at least one baseband signal for the transmit distortion based upon the sensed transmit signal, the VCO pulling compensation circuit comprising an exponential block configured to raise the transmit signal to an exponent equal to the multiple of the desired frequency.

12. The method of claim 11, wherein the VCO pulling compensation circuit further comprises a filter coupled to the exponential block configured to determine the transmit distortion by determining distortion present in the exponential of the received transmit signal.

13. The method of claim 12, wherein the VCO pulling compensation circuit further comprises:
a mixer having a first mixer input coupled to the filter; and
an adder having an adder output coupled to a second mixer input of the mixer, and a first adder input coupled to a mixer output of the mixer.

14. The method of claim 13, wherein the VCO pulling compensation circuit further comprises an emulated transmitter gain block having an input coupled to the baseband input to receive the baseband signal and an output coupled to a second adder input of the adder.

15. The method of claim 14, wherein the VCO pulling compensation circuit further comprises an additional adder having inputs coupled to the mixer output and the baseband input, and an output coupled to the transmitter.

16. The method of claim 15, further comprising coupling an input of an adder to the output of the emulated transmitter gain block, and coupling an output of the adder to another input of the emulated transmitter gain block and an input of the filter.

17. The method of claim 11, wherein the PLL further comprises a fractional divider coupled between an output of the VCO and the phase detector, and a low-pass filter coupled between the phase detector and the VCO.

* * * * *